US008768801B1

(12) United States Patent
Cheatham (10) Patent No.: US 8,768,801 B1
(45) Date of Patent: Jul. 1, 2014

(54) USER MANAGED SPENDING PLAN (75) Inventor: Alicia Danielle Cheatham, Allen, TX (US)

(73) Assignee: Intuit Inc., Mountain View, CA (US)

( * ) Notice: Subject to any disclaimer, the term of this patent is extended or adjusted under 35 U.S.C. 154(b) by 369 days.

(21) Appl. No.: 12/164,286

(22) Filed: Jun. 30, 2008

(51) Int. Cl.
*G06Q 40/00* (2012.01)
*G07B 17/00* (2006.01)
*G06Q 20/10* (2012.01)

(52) U.S. Cl.
CPC ............... *G06Q 40/00* (2013.01); *G06Q 40/10* (2013.01); *G06Q 20/10* (2013.01); *G06Q 20/102* (2013.01)
USPC .................... 705/35; 705/30; 705/39; 705/40

(58) Field of Classification Search
None
See application file for complete search history.

(56) References Cited

U.S. PATENT DOCUMENTS

| 5,953,710 | A | * | 9/1999 | Fleming ........................... 705/38 |
| 6,032,134 | A | * | 2/2000 | Weissman ........................ 705/40 |
| 7,389,912 | B2 | * | 6/2008 | Carlson et al. ................. 235/379 |
| 7,464,861 | B2 | * | 12/2008 | Gindi ............................. 235/380 |
| 7,624,073 | B1 | * | 11/2009 | Robinson et al. ............... 705/67 |
| 7,983,986 | B1 | * | 7/2011 | Carragher et al. .............. 705/39 |
| 2002/0010612 | A1 | * | 1/2002 | Smith et al. ....................... 705/8 |
| 2006/0151598 | A1 | * | 7/2006 | Chen et al. ..................... 235/380 |
| 2009/0281937 | A1 | * | 11/2009 | Gupta et al. ..................... 705/35 |

* cited by examiner

*Primary Examiner* — Ryan Zeender
*Assistant Examiner* — Denisse Ortiz Roman
(74) *Attorney, Agent, or Firm* — Osha Liang LLP (57) ABSTRACT

A method for managing credit card spending, including receiving a managed spending limit for a credit card account set by a user, where the managed spending limit does not exceed a credit limit for the credit card account, and where the managed spending limit is applied to a purchase category to obtain a managed spending plan, receiving an authorization query for a purchase associated with the credit card account, allocating the authorization query based on the purchase category to obtain an allocated purchase, responding to the authorization query based on the allocated purchase and the managed spending plan, and generating a spending report for the credit card account based on the allocated purchase and the managed spending plan.

17 Claims, 5 Drawing Sheets

USER MANAGED SPENDING PLAN

BACKGROUND

In many case, credit card issuers unilaterally make a decision concerning how much credit they will extend to a consumer. However, in some cases, consumers seeking to control their monthly budgets may wish to spend less than the assigned credit limit but may simply keep charging expenses because the credit is available. In such cases, a budget management tool that would allow consumers to set their own credit limits would be useful. It would help consumers to become better at managing and controlling credit card spending.

Most consumers have certain problem areas where they consistently go over budget. If they could identify, track, and control spending in those areas, they will stand a better chance of staying within budget. On the other hand, consumers also need some amount of budget flexibility since, at times, necessary expenses are greater than others.

SUMMARY

In general, in one aspect, the invention relates to a method for managing credit card spending. The method comprises receiving a managed spending limit for a credit card account set by a user, wherein the managed spending limit does not exceed a credit limit for the credit card account, and wherein the managed spending limit is applied to a purchase category to obtain a managed spending plan, receiving an authorization query for a purchase associated with the credit card account, allocating the authorization query based on the purchase category to obtain an allocated purchase, responding to the authorization query based on the allocated purchase and the managed spending plan, and generating a spending report for the credit card account based on the allocated purchase and the managed spending plan.

In general, in one aspect, the invention relates to a system for managing credit card spending. The system comprises a financial management application, operatively connected to a computing device, comprising functionality to receive a managed spending limit for a credit card account set by a user, wherein the managed spending limit does not exceed a credit limit for the credit card account, and wherein the managed spending limit is applied to a purchase category to obtain a managed spending plan, a server, communicatively connected to the computing device, comprising functionality to receive an authorization query for a purchase associated with the credit card account, an allocation engine, operatively connected to the server, comprising functionality to allocate the authorization query based on the purchase category to obtain an allocated purchase, an authorization engine, operatively connected to the allocation engine, comprising functionality to respond to the authorization query based on the allocated purchase and the managed spending plan, and an account service module, communicatively connected to the computing device, comprising functionality to generate a spending report for the credit card account based on the managed spending plan and the allocated purchase.

In general, in one aspect, the invention relates to a computer readable medium storing instructions for initiating an electronic funds transfer using a mobile device. The instructions comprise of functionality for receiving a managed spending limit for a credit card account set by a user, wherein the managed spending limit does not exceed a credit limit for the credit card account, and wherein the managed spending limit is applied to a purchase category to obtain a managed spending plan, receiving an authorization query for a purchase associated with the credit card account, allocating the authorization query based on the purchase category to obtain an allocated purchase, responding to the authorization query based on the allocated purchase and the managed spending plan, and generating a spending report for the credit card account based on the allocated purchase and the managed spending plan.

Other aspects and advantages of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for managing credit card spending. Specifically, embodiments of the invention provide a method and system to receive a managed spending limit for a credit card account that is set by a user, wherein the managed spending limit does not exceed the credit limit for the credit card account, and wherein the managed spending limit is applied to one or more purchase categories to obtain a managed spending plan. Further, an authorization query for a purchase that is associated with the credit card account may be allocated to a purchase category to obtain an allocated purchase, and, if it corresponds to an allocated purchase, the response to the authorization query is based upon the managed spending plan. In one or more embodiments of the invention, a spending report is generated based on the allocated purchase and the managed spending plan.

In one or more embodiments of the invention, the managed spending plan and/or spending report may be modified by the user. In one or more embodiments of the invention, the user may allocate a payment to the credit card account to the one or more purchase categories.

Figure 1:
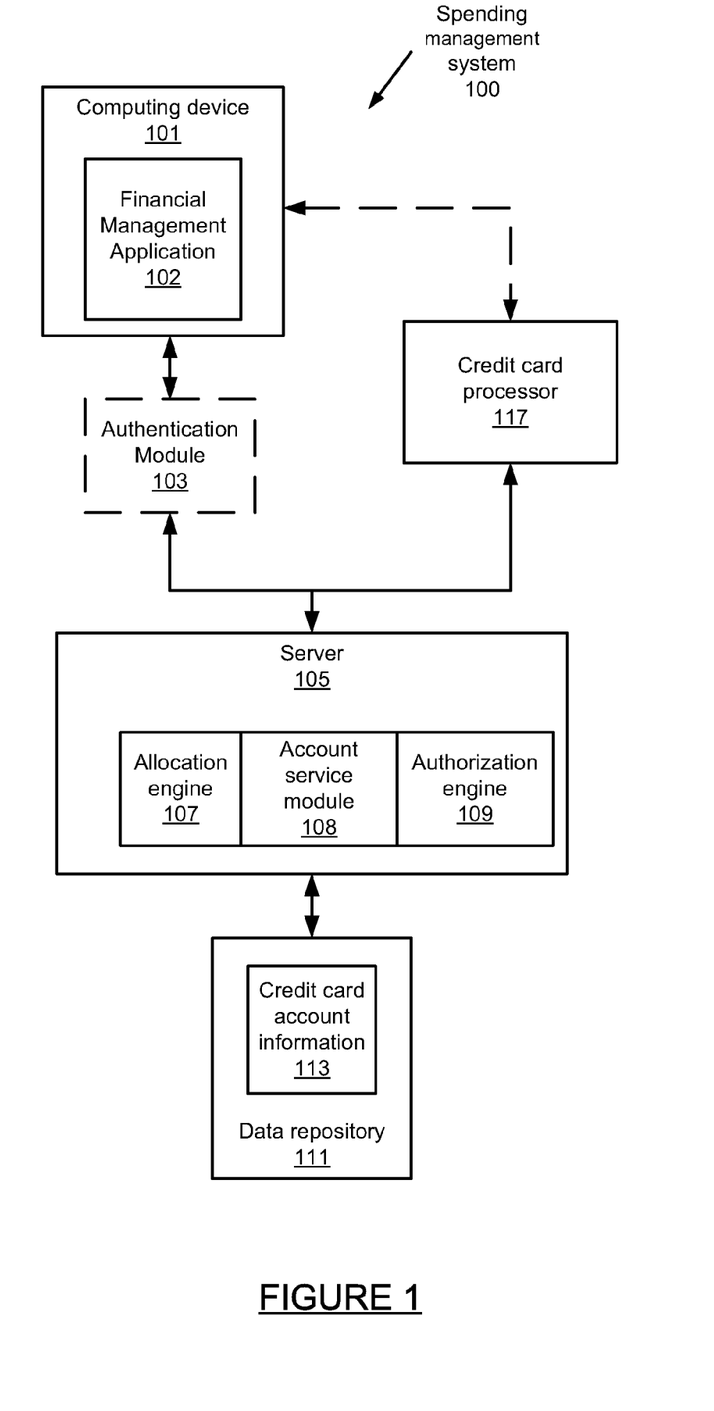
FIG. 1 shows a diagram of a system in accordance with one or more embodiments of the invention.

FIG. 1 shows a schematic diagram of a system in accordance with one or more embodiments of the invention. As shown in FIG. 1, the system includes a computing device (101), a financial management application (102), a server (105), an allocation engine (107), an authorization engine (109), an account service module (108), and a data repository (111). These are described below.

In one or more embodiments of the invention, a computing device (101) is any type of device that may be used to interact with a user (not shown) to facilitate input of a user spending limit and purchase category and display a spending report. For example, the computing device (101) may be a mobile device, a computer system, or any other such device capable of processing data. Example of mobile devices include a mobile telephone, a laptop computer, a personal digital assistant, a smart phone, or any other such portable device capable of processing data. Examples of computer systems include a desktop computer, a workstation computer system, and other such systems capable of processing data.

In one or more embodiments of the invention, the computing device (101) includes functionality to interact with one or more users. A user is an individual or business entity that conducts a financial transaction using a credit card account, generally a revolving credit agreement. As user herein, the term credit card refers to a card (actual or virtual) associated with an account number assigned to a user with a credit limit that can be used to purchase goods and services and to obtain cash disbursements on credit, for which the user is subsequently billed by an issuer for repayment of the credit extended at once or on an installment basis, for which the user's asset account is debited by the issuer (e.g., debit card), or for which the amount is deducted from the amount of credit the user has put into the account (e.g., smart or gift card). The issuer may include a bank or other financial institution, entertainment, department store, gasoline, merchant, or secured account card. For example, a financial institution may issue a VISA®, Mastercard®, American Express®, or Diners Club® credit card. Also, an individual product or service provider may issue a credit card pursuant to specific terms of a revolving credit agreement, such as Macys®, Sears®, or BP®. The user may conduct financial transactions for the user, or for the benefit of another individual or entity. The financial transaction may be to purchase one or more products, pay a debt, or perform other such transactions. The products may be one or more goods (e.g., groceries, clothing, gasoline) or services (e.g., medical care, access to research tools, utilities). A merchant is a retailer or any other person, firm, or corporation that agrees to accept credit cards. VISA is a registered trademark of VISA Inc. Mastercard is a registered trademark of Mastercard Worldwide. American Express is a registered trademark of American Express Company. Diners Club is a registered trademark of Diners Club International Ltd. Macys is a registered trademark of Macy's Department Stores, Inc. Sears is a registered trademark of Sears Brands, LLC LTD LIAB. BP is a registered trademark of [British Petroleum] BP p.l.c.

As shown in FIG. 1, in one or more embodiments of the invention, the system includes a financial management application (102). The financial management application (102) is configured to manage financial data for one or more users (i.e., individuals, families, and/or businesses). The financial management application (102) may be a stand-alone application operating on a user computer device or may be a web-based application accessible using a web browser. In some cases, the financial management application (102) may include a combination of stand-alone and web-based features. For example, a stand-alone application may be configured to communicate with a back-end server providing shared services to multiple instances of the financial management application (102).

In one or more embodiments of the invention, the financial management application (102) includes a user account (not shown) with which financial data are associated. For the purposes of this discussion, a "user account" is a logical construct that is internal to the financial management application (102) and used to organize data for a particular user or a defined group of users. The financial management application (102) may include multiple user accounts for multiple users. For example, different members of a family or different business groups may have different user accounts in the financial management application (102).

Continuing with FIG. 1, the data repository (111) is any type of storage unit and/or device (e.g., a file system, database, collection of tables, or any other storage mechanism) for storing data for later access in accordance with one or more embodiments of the invention. Further, the data repository (111) may include multiple different storage units and/or devices. The multiple different storage units and/or devices may or may not be of the same type or located at the same physical site. For example, a portion of the data repository (111) may be on an identity server while another portion is distributed across the Internet. In one or more embodiments of the invention, the data repository (111), or a portion thereof, is secure.

In one or more embodiments of the invention, the data in the data repository (111) includes credit card account information (113). Credit card account information (113) includes financial and personal information related to the credit card account, for example, the name and contact information of all authorized users, credit limit information, a managed spending plan, a spending report, user preferences, payment data, security data, and other such information. In one or more embodiments of the invention, credit card account information includes data associated with the credit card account. For example, this could include information about a user's credit agreement with a credit card issuer, user information, and data associated with use of that credit card, such as a credit card account number, terms of use, credit limit, and user options. In one or more embodiments of the invention, the financial management application (102) obtains information for the credit card account directly from an issuer, using an electronic connection such as the Internet. In some cases, financial data may also be entered into the financial management application (102) manually. Further, the credit card account may include multiple credit cards, users, or other financial accounts.

Authorized users includes all individuals or entities authorized under a credit agreement, or separate agreement, to use the credit card. For example, authorized users could include one or more primary cardholders to whom credit is being extended by the issuer, and additional users who are authorized by the primary cardholder(s) to use the credit card. A parent to whom a credit card is issued may be the primary cardholder, while a child of the primary cardholder may only be an authorized user.

In one or more embodiments of the invention, a primary cardholder may have greater access and/or modification rights to certain aspects of the invention, including the account service module. For example, in one or more embodiments of the invention, the managed spending plan may be modified only by the primary cardholder.

As used herein the credit limit means the maximum amount of credit which the issuer has agreed to extend to authorized users under the related credit card account agreement. A managed spending plan includes a managed spending limit that does not exceed the credit limit, and one or more purchase categories to which the managed spending limit is applied. The user may set both the managed spending limit, designate purchase category(ies), and allocate the managed spending limit to the one or more purchase categories. In one or more embodiments, a user may direct that a payment to the credit card account be apportioned to one or more purchase categories. The managed spending plan and apportioned payments are discussed below.

Although FIG. 1 shows credit card account information stored in a single data repository, those skilled in the art will appreciate that the credit card account information may or may not all be stored in a data repository. For example, the storage structure of the data repository (111) may distinguish between general user and/or credit card account data and data associated with the managed spending plan. Data may be stored in the data repository (111) using any possible storage structure. For example, the data repository (111) may be a relational database. The data associated with the credit card limit, for example, may be stored in one table, managed spending limit data may be stored in another table, and the purchase category(ies) may be stored in another table. The tables, for example, may include cross references to each other.

Although FIG. 1 shows the data repository (111) as a separate component from the computing device (101), the computing device (101) may include the data repository (111). Specifically, the data repository (111) may be storage in which at least a portion is local to the computing device.

In one or more embodiments of the invention, access to the server (105) and the data repository (111) is restricted by an authentication module (103). Specifically, the authentication module (103) is configured to ensure that only authorized users are given access to the account service module (108) and/or credit card account information (113). For example, the authentication module (103) may require a user to present a username and/or password, an encrypted digital signature, or any other type of authorization credential recognized as valid by the authentication module (103). In one or more embodiments, the data repository (111) is located in a local area network (LAN) and the authentication module (103) includes a firewall protecting the LAN from unauthorized access.

Returning to the computing device on FIG. 1, the computing device (101) includes financial management software (102). The financial management software (102) includes functionality to receive data from a user regarding a managed spending plan and display a spending report based on a purchase associated with the credit card that is allocated to a purchase category. Specifically, the financial management software (102) includes a data entry field for a managed spending limit and a means to designate one or more purchase categories and apportion some or all of the managed spending limit over the one or more purchase categories. For example, the user may select one or more purchase categories from an existing list or enter purchase category parameters (e.g., type of purchase, list of merchants/service providers, location of purchase, etc.) using the financial management software (102).

The financial management software (102) is also configured to display the spending report on one or more computing devices. A spending report includes information concerning the managed spending plan. For example, the spending report may include the total amount of credit remaining under the managed spending limit, the amount of credit remaining under the managed spending limit broken down by purchase category, and credit card payments allocated under the managed spending plan. Those skilled in the art will appreciate that the spending report may contain many other types of information relevant to the credit card account, such as the credit card limit, total amount of purchases authorized to date, spending history, terms of the credit agreement, etc.

In one or more embodiments, the spending report is generated by the financial management software (102) based on data received from an account service module (108), discussed below. In one or more embodiments, the spending report is generated by the account service module (108) and sent to the computing device (101). In one or more embodiments, the financial management software (102) may also be configured to allow a user to allocate a payment to the credit card account to one or more purchase categories. Allocated payments are discussed below.

In one or more embodiments of the invention, the financial management software (102) includes a user interface (not shown). In one or more embodiments of the invention, the computing device (101) may interact with a user interface for displaying the spending report and receiving input concerning the managed spending plan. The user interface may be a web interface, a graphical user interface (GUI), a command line interface, an application interface or any other suitable interface. The interface may also include one or more web pages that can be accessed from a computer with a web browser and/or internet connection. Alternatively, the interface may be an application that resides on a computing system, such as a PC, mobile devices, a PDA, and/or other computing devices of the users, and that communicate with one or more components of the system (100) via one or more network connections and protocols. In one or more embodiments of the invention, the user interface is specific to the computing device (101). Specifically, the user interface may include one user interface that accounts for limited screen size of a mobile device and another user interface with increased functionality for a personal computer.

Although FIG. 1 shows the financial management application (102) as executing locally on the computing device, the financial management application (102) may execute on a remote computing device, such as a server (e.g., server (105)). For example, the financial management application (102) may be a web application. In another example, the financial management application (102) may be a plug-in to a web browser. Alternatively, the financial management application (102) may be a distributed application. In such example, a client portion of the financial management application (102) may execute on the user computer device (101) and a server (e.g., server (105)) portion of the payment application may execute on a remote computer system.

In one or more embodiments of the invention, the financial management application (102) executes on multiple computing devices. For example, the financial management application (102) may execute on a mobile device and on a personal computer. In the example, the user is able to access the financial management application (102) regardless of whether the user is at a merchant's physical location or at home. In one or more embodiments of the invention, the financial management application (102) on the different computing device may include functionality to synchronize data with each other. For example, if the user changes the managed spending plan using financial management application (102) using a mobile device and the data is stored locally, then the change may be automatically propagated to the financial management application (102) on the user's personal computer.

As shown in FIG. 1, in one or more embodiments, the financial management application (102) is communicatively connected to a server. The server includes functionality to receive data from the financial management software (102) and a credit card processor (117), including an authorization query for a purchase associated with the credit card account. Certain steps may be necessary to configure the financial management application (102) or authorization query data transmission (not shown) to work with the server (105). For example, the computing device (101) or a transaction processing system may use a connection processor (not shown) to establish a connection between the user/credit card processor and the server and—in the context of that connection (including access to the server's application/dataset manager)—perform operations related to the associated applications. A connection processor (not shown) is a tool that implements the basic mechanisms by which the computing device (101) and/or transaction processing system connects to the infrastructure on the server (105). It establishes the communication channel that allows a connection setting (e.g., URL or network address of the server) to be used by the computing device (101) and/or transaction processing system such that the connection is authenticated and enabled to allow the user/processor to retrieve data from the account service module (108) or authorization engine (109). The connection processor (not shown) can be invoked whenever access to or information about the credit card account or managed spending plan is needed. Typically, the connection processor is invoked on demand (a) when the user's/processor's interaction with the financial management software (102) or authorization engine (109) on the computing device (101) requires a connection (e.g., an explicit request by the user to log into the server to get a spending data update); or (b) when triggered by an application or system need.

In one or more embodiments of the invention, the credit card processor (117) is a merchant service provider that handles the details of processing credit card transactions between merchants, issuers, and merchant account providers. For example, banks, third party merchant accounts, independent sales organizations, financial service providers (e.g., American Express® and Discover®), and business/trade organizations may all provide credit card processing services. In addition, some merchants also act as credit card processors for their own credit card accounts. American Express is a registered trademark of American Express Company. Discover is a registered trademark of Discover Financial Services.

As shown in FIG. 1, in one or more embodiments, an allocation engine (107) is operatively connected to the server (105). The allocation engine (107) includes functionality to allocate the authorization query to one or more purchase categories. Specifically, the allocation engine (107) determines whether the authorization query applies to a purchase category incorporated in the managed spending plan. In one or more embodiments of the invention, the allocation engine (107) may also allocate payments made to the credit card account to one or more purchase categories.

In one or more embodiments of the invention, the allocation engine (107) may link digital files to records based on metadata describing the digital files, as described herein. Specifically, the allocation engine (107) may be configured to parse a digital file to obtain the metadata, allocate the digital file based on the financial management application (102) and/or the account service module (108), identify a record in the financial management application (102) and/or the account service module (108) that is associated with the digital file, and link the digital file to the record.

Many different types of metadata may be obtained from a digital file, depending on the type of file and the contents therein. For example, metadata may include the file extension, the file size, the date and/or time the file was created, the naming convention used for the file, the format of the file contents (e.g., hypertext markup language (HTML), extensible markup language (XML), comma-separated values, or any other type of identifiable format), the colors (if applicable) of elements in the file, specific images included in the file (for example, a company logo), keywords in the file (for example, company names, product names, finance-related terms, or any other type of keyword), a uniform resource locator (URL) where the file was obtained, an email address from which the file originated, or any other type of identifiable metadata.

With respect to the format of the contents of the file, metadata may also identify specific structures, such as a specific stylesheet or XML schema. In other words, the digital file may conform to a predetermined file specification. In one or more embodiments of the invention, the file specification is provided to the allocation engine (107) by the entity that generated the digital file. For example, the entity that generated the digital file may be a business using a proprietary file format for digital files of a particular type. Alternatively, the file specification may be provided by the same entity that produced the allocation engine (107). Specifically, the entity that produced the allocation engine (107) may publish a digital file specification, and other entities may generate digital files using that specification to help facilitate allocating the digital files based on the financial management application (102) and/or account service module (108). As another alternative, the file specification may be provided by another entity altogether (i.e., neither the entity that generated the digital file nor the entity that produced the allocation engine (107)).

The aforementioned types of metadata are provided as examples only. A digital file may include many different types of metadata that are not explicitly disclosed herein but nonetheless fall within the scope of the invention.

As noted above, in one or more embodiments of the invention, the allocation engine (107) may be part of an indexing engine (not shown). An indexing engine (not shown) is a hardware and/or software component configured to create an index of digital files stored on a computer system. For example, in many cases, an indexing engine (not shown) operates by traversing a file system or a portion thereof. The indexing engine (not shown) may be general (configured to index many different types of digital files) or specific (for example, configured to index only digital images, emails, or other specific types of digital files). In any case, the allocation engine (107) may be configured to parse digital files encountered by the indexing engine to determine whether the digital files include financial data associated with the managed spending plan. In one or more embodiments of the invention, the allocation engine (107) is configured to import digital files thus identified into the financial management application (102) and/or the account service module (108). Further, the allocation engine (107) may be configured to prompt a user before importing such digital files. For example, a list of the digital files may be presented to the user and the user may select which files to import into the financial management application (102).

Alternatively, the allocation engine (107) may be part of neither a web browser plug-in nor an indexing engine. For example, the allocation engine (107) may be a stand-alone application module configured to interface with the account service module (108) and/or the financial management application (102), and may include functionality for a user to "drag-and-drop" authorized purchases and/or a credit card payment to one or more purchase categories. Those skilled in the art, having the benefit of this disclosure, will appreciate that the allocation engine (107) may take many different forms, and many different techniques may be used to initiate allocation of a authorization query and/or a credit card payment by the allocation engine (107).

As shown in FIG. 1, in one or more embodiments, an authorization engine (109) is operatively connected to the server (105). The authorization engine (109) includes functionality to respond to the authorization query based on whether or not the allocation engine (107) allocates an authorization query to a purchase category associated with the managed spending plan for the credit card account. Specifically, the authorization engine (109) responds by either approving or declining a request by a merchant for payment associated with the credit card account. Authorization is defined in operations regulations whereby a transaction is approved by or on behalf of an issuer, commonly understood to be receiving of a sales validation by the merchant, by telephone, or authorization terminal. The authorization queries may be submitted by a merchant as a batch or captured using real-time processing by the credit card processor (117). If an authorization query is declined, the authorization engine (109) may notify the credit card processor (117), for example, by returning a CARDREFUSED reply flag. In one or more embodiments of the invention, the authorization engine (109) may initially place a temporary hold placed on credit card funds associated with the managed spending plan after a general authorization module authorizes a transaction. For example, a general authorization module may authorize a transaction on the grounds that it does not exceed the available credit limit in the credit card account. If the authorization query in question is allocated to a purchase category, the authorization engine (109) may place a temporary hold on managed credit limit funds pending a user's receipt and acknowledgement of a related spending report. Alternatively, the entire transaction may be handled by the authorization engine (109) as a stand-alone application.

As shown in FIG. 1, in one or more embodiments, an account service module (108) for the credit card account is communicatively connected to the financial management software (102). The account service module (108) includes functionality to generate a spending report for the credit card account based on the allocated purchase and the managed spending plan. In one or more embodiments, the account service module (108) executes remotely on a server (e.g., 105). Alternatively, the account service module (108) may be a module within the financial management application (102) itself. For example, as discussed below, the account service module (108) may be part of a web browser plug-in or indexing engine.

As noted above, in one or more embodiments of the invention, the account service module (108) may be part of a web browser plug-in. Specifically, in one or more embodiments of the invention, the account service module (108) is configured to import data from web pages into the financial management application (102). For example, the web browser plug-in may include a user-selectable button configured to initiate the account service module (108). In other words, the account service module (108) may be configured to import the currently displayed web page into the financial management application (102) when a user selects the button (e.g., a "spending report" button). For the purposes of this discussion, a "web page" may refer to any type of digital file displayed using a web browser. For example, web pages may include hypertext, XML, images, portable document format (PDF) files, text documents, or any other type of digital file that may be displayed using a web browser.

In one or more embodiments of the invention, the account service module (108) is configured to generate an alert when the allocation engine (107) determines that an authorization query is associated with a purchase category. As one example, the alert may take the form of an icon or other indicator associated with a web browser plug-in. As another example, the alert may take the form of a dialog box with a link to an updated spending report incorporating the most recent authorized purchase associated with the spending plan or a text/multimedia message. The format of the alert or notification may be modified for use by the specific computing device. For example, a user may set a preference for a spending report summary to be sent to his or her mobile phone and/or a full spending report attached as a document to his or her electronic mail address. The specific message used may vary depending on the specific implementation and/or the type of digital file encountered. Based on the alert, a user initiate a modification of the spending plan using the financial management software (102).

Figure 2A:
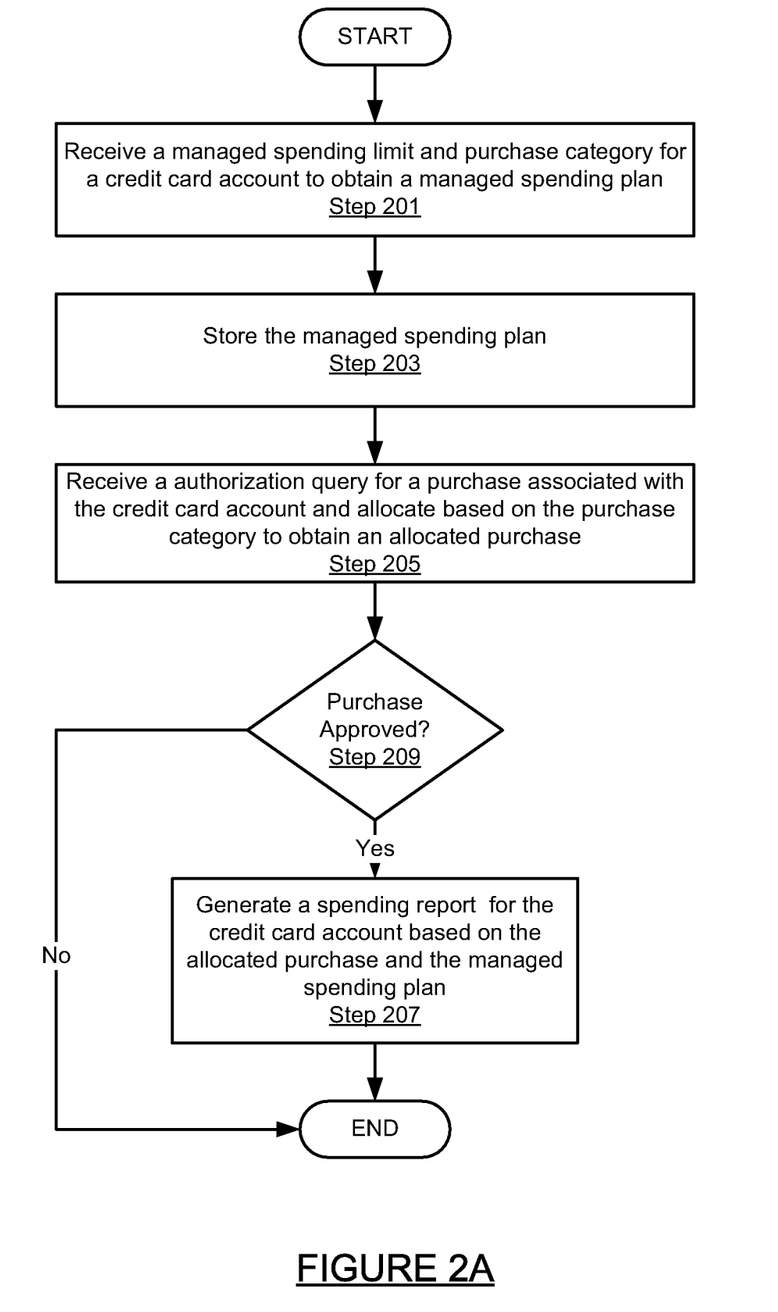
FIGS. 2A-2B show flowcharts of a method for managing credit card spending in accordance with one or more embodiments of the invention.
Figure 2B:
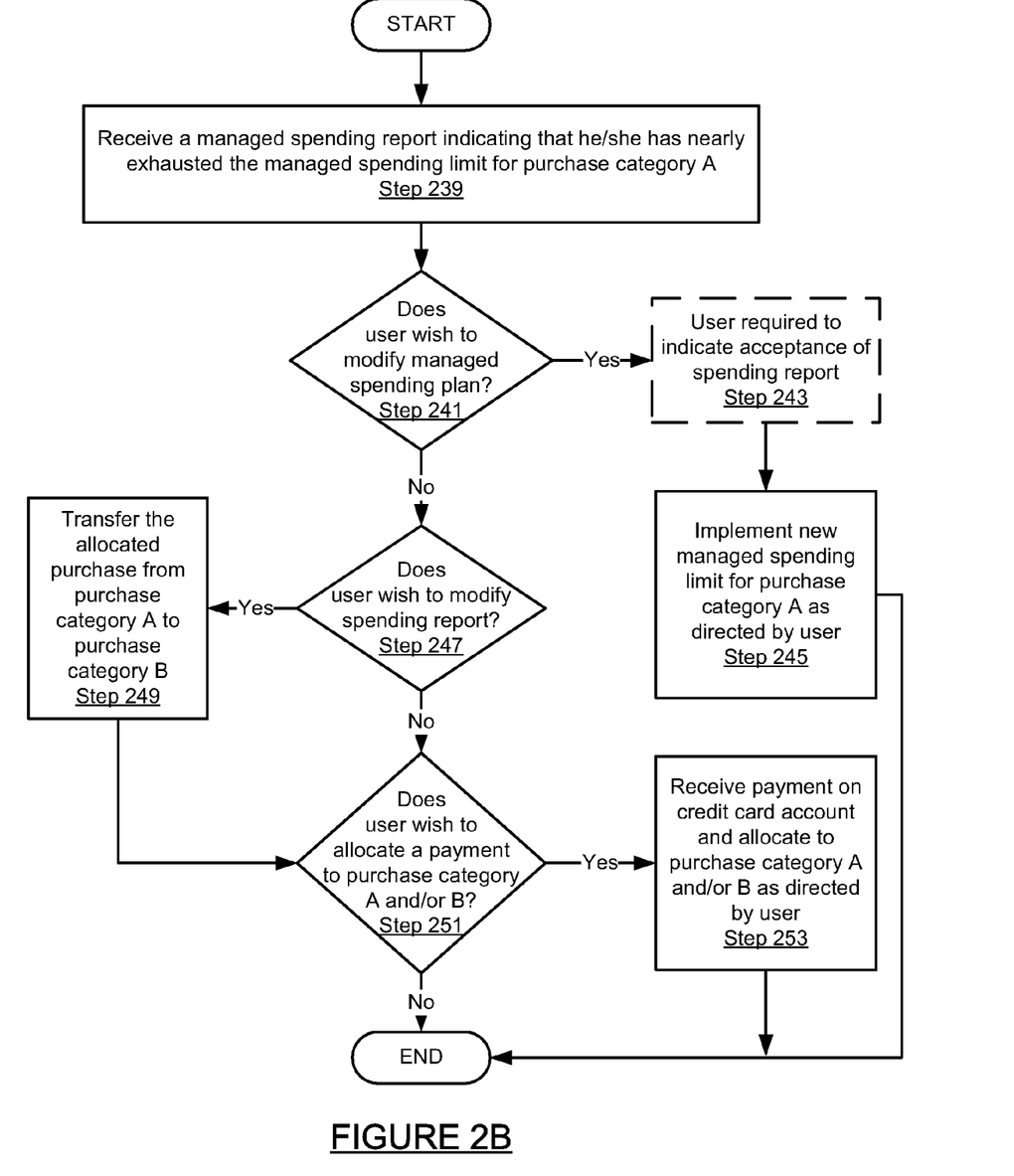

FIGS. 2A-2B show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. In addition, steps such as receive acknowledgements have been omitted to simplify the presentation.

FIG. 2A shows a flowchart of a method for managing credit card spending in accordance with one or more embodiments of the invention. As shown in Step 201 of FIG. 2A, in one or more embodiment of the invention, the system receives a managed spending plan for a credit card account set by a user. The managed spending plan comprises a managed spending limit that does not exceed the credit limit available under the credit account agreement, and one or more purchase categories. For example, the credit limit set by the issuer on a particular credit card account could be $5000. A user trying to control expenses may set a managed spending limit of $1000, and may further apply this managed spending limit over one or more purchase categories. Examples of purchase categories includes retail clothing, restaurants, entertainment, groceries, books, personal health, dry cleaning services, etc. Purchase categories could also be defined as all purchases from a particular merchant, e.g., Banana Republic®, Safeway®, or Blissworld.com®. The purchase categories may be presented as an existing list (e.g., a check box list) from which the user may indicate which categories will fall under the managed spending plan, and assign what portion of the managed spending limit will represent the maximum amount of allowed purchases in each category. Alternatively, the user may enter his or her own purchase categories. For example, the user may enter the name of a favorite local restaurant as a purchase category. Banana Republic is a registered trademark of Gap Inc. Safeway is a registered trademark of Safeway Inc. Blissworld.com is a registered trademark of BlissWorld LLC.

As shown in Step 203, in one or more embodiments, the managed spending plan is stored in a data repository. In one or more embodiments of the invention, access to the managed spending plan is restricted. Restricting access to the managed spending plan involves ensuring that only authorized entities (for example, businesses, individuals, and/or government entities) have access to the managed spending plan and other credit card account information. For example, access may be restricted by enforcing a username and/or password, an encrypted digital signature, or any other type of authorization credential. Further, access may be restricted based on a location of the data repository in a network. For example, the data repository may be located in a local area network (LAN) and access may be restricted using a firewall that protects the LAN from unauthorized access.

Further, in one or more embodiments of the invention, access to the managed spending plan is restricted based on whether a user has purchased access to the managed spending plan. In other words, access to the managed spending plan may be sold and non-paying users may be restricted from accessing the data. For example, an entity may purchase access to query (using Structured Query Language (SQL), a report interface, or any other appropriate query mechanism) the account management module, managed spending plan, managed spending report, or a subset thereof. In one or more embodiments of the invention, access to the managed spending plan feature is sold using a subscription model, where the entity purchases access for a limited time period or with recurring fees.

Alternatively, a copy of the managed spending report (or a subset thereof) may be provided to the entity in an electronic storage medium. As one example, data may be packaged in an electronic file and transmitted to the entity via File Transfer Protocol (FTP), email or any other type of electronic transmission. As another example, a data set including the managed spending report (or a subset thereof) may be written to a portable storage medium such as a compact disc (CD), digital video disc (DVD), flash drive, or any other type of portable storage medium given to the purchasing entity. Many different purchase and delivery models may be used to provide restricted access to the system.

As shown in Step 205, in one or more embodiments of the invention, an authorization query for a purchase associated with the credit card account is received and may be allocated to one or more purchase categories. An authorization query includes, for example, a credit card account number and/or other identifying information, a total amount for an order/purchase made under the credit card account, information concerning the merchant and/or type of order/purchase, a request by a merchant for payment by the issuer and/or a temporary hold against the credit card account for some or all of the total amount. Based on the authorization query, some or all of the purchase amount may be allocated to one or more purchase categories designated under the managed spending plan. For example, continuing the example above, a user may set a managed spending limit of $1000, divided equally among two categories: clothing (managed spending limit: $500) and restaurants (managed spending limit: $500). If an authorization query for $200 is received from a restaurant, it will be allocated to the restaurant purchase category, i.e. it is an "allocated" purchase because it falls into a purchase category set by the user under the managed spending plan.

In one or more embodiments of the invention, the user may modify an allocated purchase. Specifically, if the system allocates an authorization query to a purchase category but the user believes that allocation is incorrect, he/she may modify the allocation. Modifications of allocated purchases are discussed below.

As shown in Step 205, in one or more embodiments of the invention, the system responds to the authorization query based on the allocated purchase. For example, if the authorization query from the local restaurant is $200, that is less than the total managed spending limit for that category (in this example, $500). In that case, the authorization query will be approved and, as shown in Step 207, a managed spending report reflecting this activity is generated if the purchase is approved (Step 209).

In another example, if an authorization query issues from a clothing merchant for the amount of $600, the authorization query would be declined based on the managed spending limit for clothing purchases (in this example, $500). If on the other hand, the authorization query does not related to a purchase category, the system responds to the authorization query based solely on the credit card limit for the credit card account. For example, in the example outlined above, the credit card issuer has set a credit limit on of $5000. If an authorization query is received from a grocery store for $250, and the purchase categories are clothing ($500) and restaurants ($500), the grocery authorization query is not an allocated purchase. Therefore, as long as there is sufficient credit remaining (inclusive of all allocated and non-allocated purchases) under the credit card account, the grocery authorization query will be approved based on the credit card limit. If, however, the total balance due on the credit card account is $4,900, then the grocery authorization query would be declined based on the credit card limit.

In one or more embodiments, a spending report is generated reflecting the activity under the managed spending plan. The possible methods of transmission and content for a spending report have been discussed above. In one or more embodiments, the user must actively request the spending report. For example, the user may select a web browser button to access and launch a current (or historical) spending report. In one or more embodiments, a spending report is automatically sent (e.g., electronic mail, text messaging, etc.) to one or more computing devices at regular intervals. For example, a spending report may be issued daily, weekly, or whenever new activity related to the managed spending plan is noted. In one or more embodiments, a spending report may automatically be sent to the user based on certain triggering events, such as declining an authorization query based on the managed spending limit, or near exhaustion of the managed spending limit in one or more purchase categories. Those skilled in the art will realize that the provision of a spending report may be accomplished in numerous ways, and using means both now known and later realized, without deviating from the spirit of this invention.

As shown in Step 241 of FIG. 2B, in one or more embodiments of the invention, a user may modify the managed spending plan. Specifically, the user may raise or lower the managed spending limit, modify the purchase categories, or raise or lower the managed spending limit as applied to one or more purchase categories. In one or more embodiments, as shown in Step 243, the user may be required to indicate acceptance of the spending report before the user can modify the managed spending plan.

For example, as shown in Step 239 of FIG. 2B, a user may receive a managed spending report indicating that he/she has nearly exhausted the managed spending limit for purchase category A. In one or more embodiments, as shown in Step 241, the user may modify the managed spending plan in response to such notification. For example, during certain periods of the year (e.g., Christmas, birthdays) or after receiving a raise, a user may want to increase the managed spending limit. As shown in Step 245, upon receiving notification that the managed spending limit in purchase category A is nearly exhausted, the user may increase the spending limit for that purchase category. For example, if the user receives a spending report indicating that there is only $10 credit remaining for clothing purchases under the managed spending plan, the user may increase the spending limit for that purchase category by $100 to cover an additional item that the user needs to purchase.

Alternatively, in one or more embodiments, as shown in Step 247, the user may modify the spending report. For example, as shown in Step 249, the user may disagree with a purchase allocated to purchase category A, and seek to transfer the allocated purchase from purchase category A to purchase category B (or to a category that is not subject to the managed spending plan). For example, continuing with the example above, if an authorization query from Target® is allocated to the clothing purchase category, but the user actually purchased groceries (which are not a purchase category under the exemplary managed spending plan), the user may wish to de-allocate that authorization query. In one or more embodiments of the invention, users are provided a means (e.g., button on web browser, link to website, click on or scroll down menu) to modify allocated purchases. Target is a registered trademark of Target Corporation.

In one or more embodiments of the invention, as shown in Step 251 of FIG. 2B, the user may also allocate a credit card account payment to one or more purchase categories. For example, the user may make a credit card account payment in the amount of $1000, and designate $250 of the payment to purchase category A, $250 to purchase category B, and the remaining $500 to be applied generally to the credit card limit (i.e., to pay for non-allocated purchases). Payment allocations may be set up on an ongoing basis as a user preference, or the user may direct payment allocation with each payment. Further, the payment may be received on the credit card account and then allocated as directed by the user (Step 253). Those skilled in the art will appreciate that there are many ways to facilitate allocated payments in keeping with the spirit and scope of the present invention.

Figure 3:
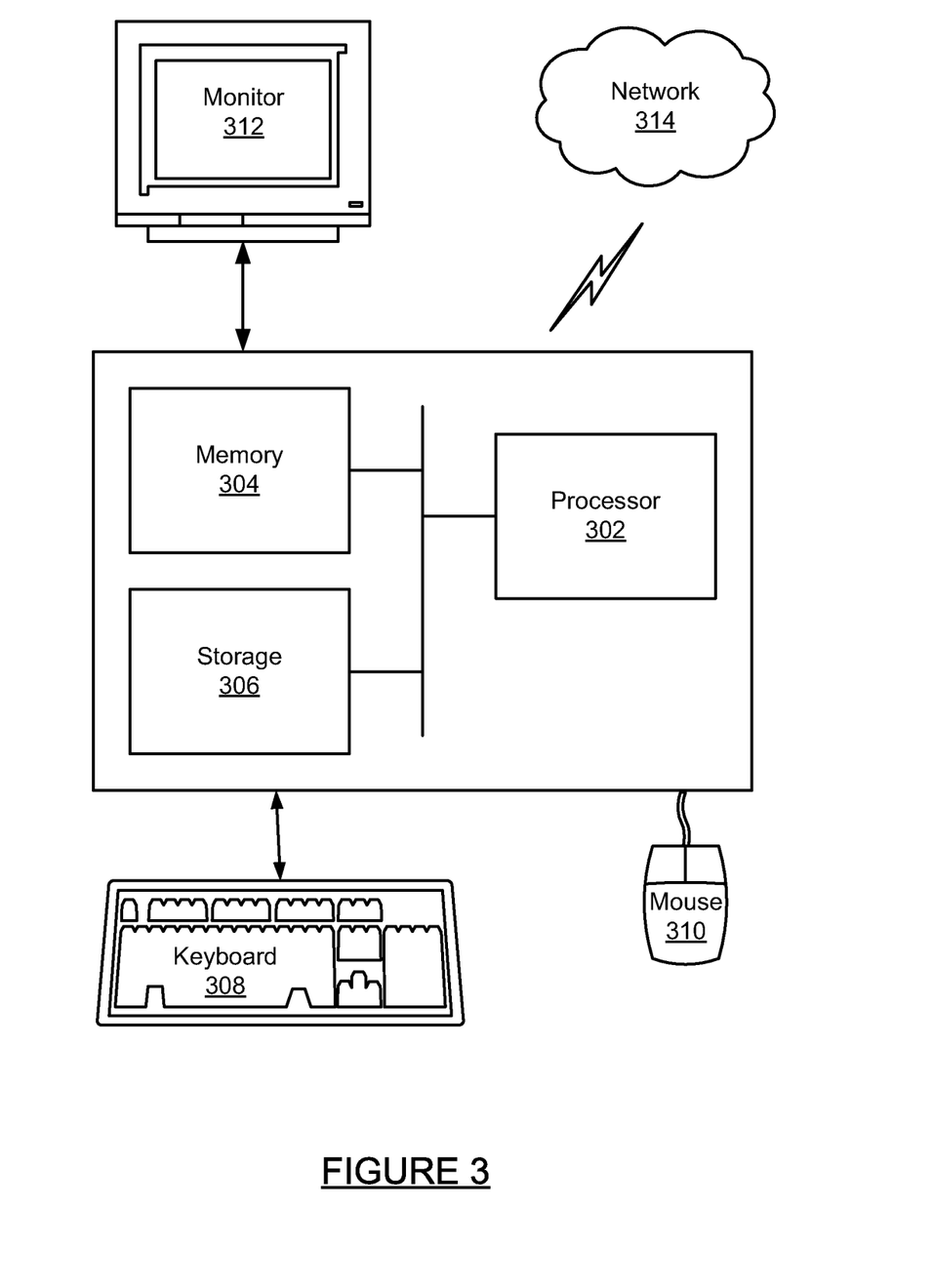
FIGS. 3-4 show diagrams of computer systems in accordance with one or more embodiments of the invention.

Embodiments of the invention may be implemented on virtually any type of computer regardless of the platform being used. For example, as shown in FIG. 3, a computer system (300) includes one or more processor(s) (302), associated memory (304) (e.g., random access memory (RAM), cache memory, flash memory, etc.), a storage device (306) (e.g., a hard disk, an optical drive such as a compact disk drive or digital video disk (DVD) drive, a flash memory stick, etc.), and numerous other elements and functionalities typical of today's computers (not shown). The computer (300) may also include input means, such as a keyboard (308), a mouse (310), or a microphone (not shown). Further, the computer (300) may include output means, such as a monitor (312) (e.g., a liquid crystal display (LCD), a plasma display, or cathode ray tube (CRT) monitor). The computer system (300) may be connected to a network (314) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (300) includes at least the minimal processing, input, and/or output means necessary to practice embodiments of the invention.

Further, those skilled in the art will appreciate that one or more elements of the aforementioned computer system (300) may be located at a remote location and connected to the other elements over a network. Further, embodiments of the invention may be implemented on a distributed system having a plurality of nodes, where each portion of the invention (for example, a data processing service, authentication service, data filter, aggregate data repository, data source, business application, application data repository, data link service, staging data repository, data processing service, and/or any other portion of the invention) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

Figure 4:
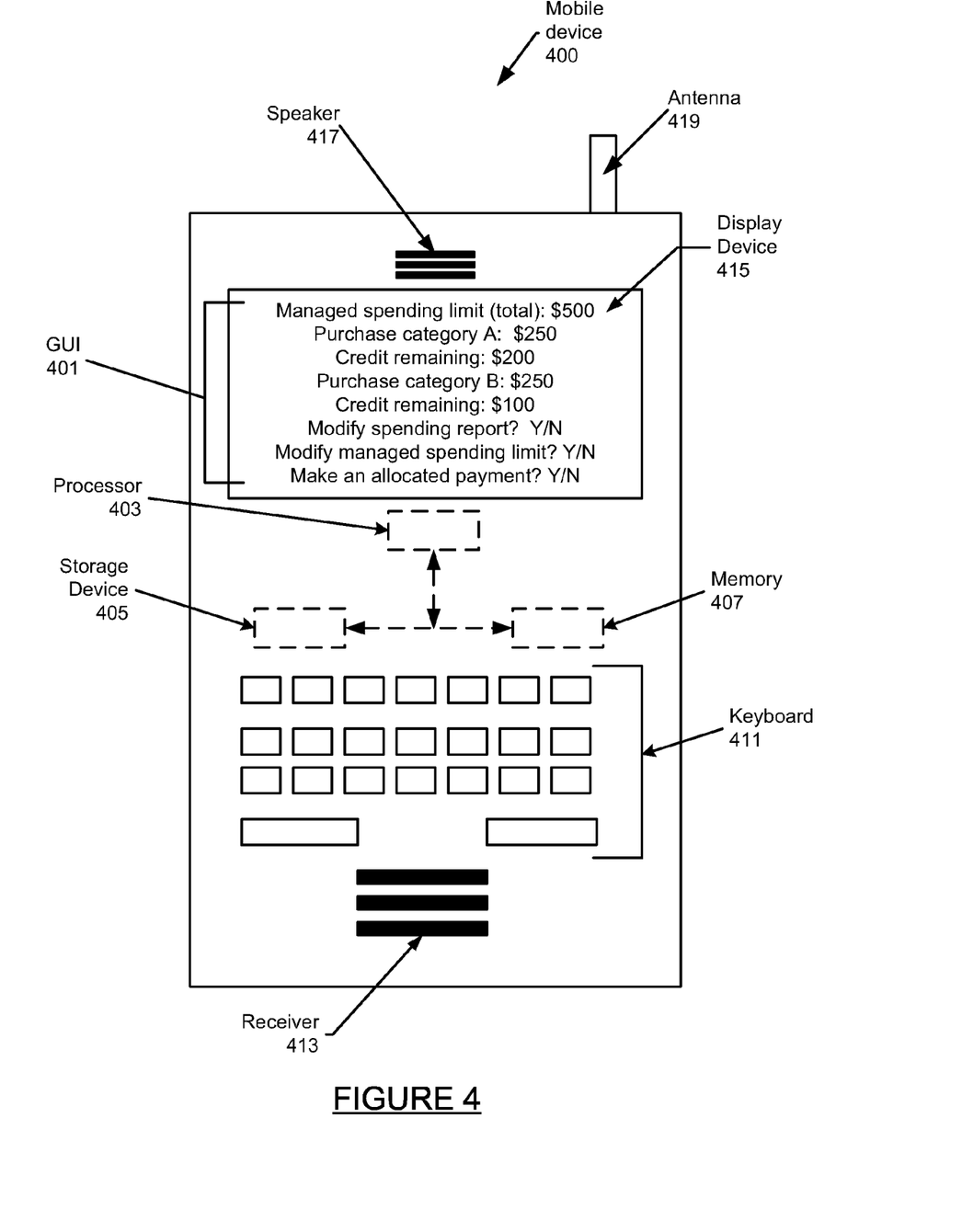

In one or more embodiments of the invention, the computing device is a mobile device, such as the device described in association with FIG. 4. For example, as shown in FIG. 4, a mobile device (400), which is essentially the same as the computing device (101) in FIG. 1, may be a mobile device equipped with a processor (403), associated memory (407), a storage device (405), a receiver (413), a speaker (417), an antenna (419), and numerous other elements and functionalities typical of today's mobile devices (not shown). The mobile device (400) may also include input means, such as a keyboard (not shown) or touch screen (not shown) that permits a user to enter keystrokes including numeric, alphabetic, and other characters, and output means, such as a display screen (e.g., a liquid crystal display screen) (415). Those skilled in the art will appreciate that these input and output means may take other forms now known or later developed. The mobile device (400) may be connected to a network (e.g., a local area network (LAN), a wide area network (WAN) such as the Internet, or any other similar type of network) via a network interface connection (not shown). Examples of mobile devices include, but are not limited to, laptop computers, cellular phones, point of sale (POS) terminals, personal digital assistants, personal communicators, pagers, and smart phones. Using embodiments of the present invention, a consumer may interact with the spending management system using the mobile device (400).

In one or more embodiments of the invention, the network connection may be facilitated by a wireless infrastructure (not shown), including one or more transceivers cooperating to facilitate wireless communications to wireless devices. The wireless infrastructure may include one or more routers, switches, microwave links, base stations, optical fibers, or other similar networking hardware or software components. For example, the wireless infrastructure may be a paging network, a cellular network, etc. In one or more embodiments of the invention, the wireless infrastructure may associate any message received from a mobile device (400) with a mobile device identifier of the mobile device (400).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing credit card spending, comprising:

identifying, within a credit card account comprising a credit limit, a managed spending plan set by a user and comprising a plurality of purchase categories having a plurality of managed spending limits and a plurality of balances, wherein the credit limit exceeds a sum of the plurality of managed spending limits;

receiving a transaction authorization query comprising a purchase price for an item;

selecting, by an issuer of the credit card account and using a hardware processor, a first purchase category of the plurality of purchase categories based on the transaction authorization query;

generating, by the issuer and using the hardware processor, a comparison by comparing the purchase price with a difference between a managed spending limit for the first purchase category and a balance of the first purchase category;

responding to the transaction authorization query based on the comparison;

generating, using the hardware processor, a spending report for the credit card account based on the purchase price and the managed spending plan;

implementing a user request to modify the spending report, wherein the user request comprises transferring the purchase price associated with the transaction authorization query from the first purchase category to a second purchase category of the plurality of purchase categories in the credit card account;

receiving, from the user, a credit card account payment less than an outstanding balance on the credit card account;

obtaining a user preference comprising an ongoing payment allocation for the credit card account set by a financial management application operated by the user, wherein the ongoing payment allocation applies to multiple credit card account payments;

allocating, by the hardware processor and based on the ongoing payment allocation, a first portion of the credit card account payment to the first purchase category; and allocating, by the hardware processor and based on the ongoing payment allocation, a second portion of the credit card account payment to a second purchase category of the plurality of purchase categories.

2. The method of claim 1, wherein the first purchase category is set by the financial management application operated by the user.

3. The method of claim 2, further comprising:
providing the spending report to the user within the financial management application.

4. The method of claim 3, wherein the spending report comprises an account alert notifying the user that the difference is approaching zero.

5. The method of claim 1, further comprising:
receiving a request by the user to modify the managed spending limit for the first purchase category after responding to the transaction authorization query; and
modifying the managed spending limit for the first purchase category based on the request.

6. The method of claim 5, wherein modification of the managed spending limit for the first purchase category is a right restricted to a primary cardholder.

7. The method of claim 5, wherein the request is at least one selected from a group consisting of a telephonic request, a text message request, and an electronic mail request.

8. A system for managing credit card spending, comprising:
a financial management application executing on a computing device operated by user and comprising functionality to:
create, for a credit card account comprising a credit limit, a managed spending plan comprising a plurality of purchase categories having a plurality of managed spending limits, wherein the credit limit exceeds a sum of the plurality of managed spending limits; and
set a user preference comprising an ongoing payment allocation, wherein the ongoing payment allocation applies to multiple credit card account payments;
a server, communicatively connected to the computing device, comprising functionality to:
receive a transaction authorization query comprising a purchase price for an item;
an allocation engine executing on the server and comprising functionality to:
select a first purchase category of the plurality of purchase categories based on the transaction authorization query;
allocate, based on the ongoing payment allocation, a first portion of a credit card account payment to the first purchase category; and
allocate, based on the ongoing payment allocation, a second portion of the credit card account payment to a second purchase category of the plurality of purchase categories;
an authorization engine, operatively connected to the allocation engine, comprising functionality to:
generate a comparison by comparing the purchase price with a difference between a managed spending limit for the first purchase category and a balance of the first purchase category;
respond to the transaction authorization query based on the comparison; and
an account service module, communicatively connected to the computing device, comprising functionality to:
generate a spending report for the credit card account based on the managed spending plan and the purchase price; and
modify the spending report, in response to a user request, by transferring the purchase price associated with the transaction authorization query from the first purchase category to the second purchase category of the plurality of purchase categories in the credit card account.

9. The system of claim 8, further comprising:
a data repository, operatively connected to the server, comprising functionality to store the spending report and the managed spending plan for the credit card account.

10. The system of claim 8, further comprising:
an authentication module, communicatively connected to the computing device, comprising functionality to authenticate the user to access the account service module for the credit card account.

11. The system of claim 8, wherein the account service module comprises further functionality to send a notification associated with the spending report to the computing device.

12. The system of claim 8, wherein the account service module comprises further functionality to:
receive a request by the computing device to modify the managed spending limit for the first purchase category; and
modify the managed spending limit for the first purchase category based on the request.

13. The system of claim 12, wherein modification of the managed spending limit is a right restricted to a primary cardholder.

14. The system of claim 12, wherein the request is at least one selected from a group consisting of a telephonic request, a text message request, and an electronic mail request.

15. A non-transitory computer readable medium storing instructions for managing credit card spending, the instructions comprising functionality for:
identifying, within a credit card account comprising a credit limit, a managed spending plan set by a user and comprising a plurality of purchase categories having a plurality of managed spending limits and a plurality of balances,
wherein the credit limit exceeds a sum of the plurality of managed spending limits;
receiving a transaction authorization query comprising a purchase price for an item;
selecting a first purchase category of the plurality of purchase categories based on the transaction authorization query;
generating a comparison by comparing the purchase price with a difference between a managed spending limit for the first purchase category and a balance of the first purchase category;

responding to the transaction authorization query based on the comparison;

generating a spending report for the credit card account based on the purchase price and the managed spending plan;

implementing a user request to modify the spending report, wherein the user request comprises transferring the purchase price associated with the transaction authorization query from the first purchase category to a second purchase category of the plurality of purchase categories in the credit card account;

receiving, from the user, a credit card account payment less than an outstanding balance of the credit card account;

obtaining a user preference comprising an ongoing payment allocation for the credit card account set by a financial management application operated by the user, wherein the ongoing payment allocation applies to multiple credit card account payments;

allocating, based on the ongoing payment allocation, a first portion of the credit card account payment to the first purchase category, and allocating, based on the ongoing payment allocation, a second portion of the credit card account payment to a second purchase category of the plurality of purchase categories.

16. The non-transitory computer readable medium of claim 15, wherein the first purchase category is set by the financial management application operated by the user.

17. The non-transitory computer readable medium of claim 16, wherein the instructions further comprise functionality for:

providing the spending report to the user within the financial management application.

* * * * *